(12) United States Patent
Bauer et al.

(10) Patent No.: US 10,981,837 B2
(45) Date of Patent: Apr. 20, 2021

(54) GRANULE FOR PRODUCING A FIRE-PROOF PRODUCT, USE OF SUCH GRANULES, FIRE-PROOF PRODUCT, METHOD FOR PRODUCING A FIRE-RESISTANT PRODUCT, AND PRODUCT PRODUCED BY SAID METHOD

(71) Applicant: Refractory Intellectual Property GmbH & Co. KG, Vienna (AT)

(72) Inventors: Christoph Bauer, Graz (AT); Norbert Freiberger, Graz (AT)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 362 days.

(21) Appl. No.: 15/776,070

(22) PCT Filed: Dec. 1, 2015

(86) PCT No.: PCT/EP2015/078198
§ 371 (c)(1),
(2) Date: May 14, 2018

(87) PCT Pub. No.: WO2017/092794
PCT Pub. Date: Jun. 8, 2017

(65) Prior Publication Data
US 2020/0247719 A1    Aug. 6, 2020

(51) Int. Cl.
*C04B 35/58* (2006.01)
*C04B 35/645* (2006.01)

(52) U.S. Cl.
CPC .... *C04B 35/58035* (2013.01); *C04B 35/6455* (2013.01); *C04B 2235/3206* (2013.01); *C04B 2235/3208* (2013.01); *C04B 2235/3217* (2013.01); *C04B 2235/3225* (2013.01); *C04B 2235/3244* (2013.01); *C04B 2235/3272* (2013.01); *C04B 2235/3856* (2013.01);
(Continued)

(58) Field of Classification Search
CPC .......... C04B 35/58035; C04B 35/6455; C04B 2235/3244; C04B 2235/762; C04B 2235/3856
See application file for complete search history.

(56) References Cited

U.S. PATENT DOCUMENTS 5,149,361 A * 9/1992 Iyori ...................... C22C 29/00
75/233
6,660,371 B1 * 12/2003 Westphal ................ C23C 16/30
428/216
(Continued)

FOREIGN PATENT DOCUMENTS

EP       2218503 A1    8/2010
JP    2011148014 A    8/2011

OTHER PUBLICATIONS

Grebenkina, et al., "Electro- and Thermophysical Properties of Alloys of the ZrC—ZrN System", In Soviet Powder Metallurgy and Metal Ceramics, vol. 16, No. 6, Jun. 1, 1977, pp. 448-451.

*Primary Examiner* — Noah S Wiese
(74) *Attorney, Agent, or Firm* — Medley, Behrens & Lewis, LLC

(57) ABSTRACT

The invention relates to a grain for production of a refractory product, to the use of such grains, to a refractory product, to a process for producing a refractory product and to a refractory product produced thereby.

9 Claims, 4 Drawing Sheets

Figure 1:
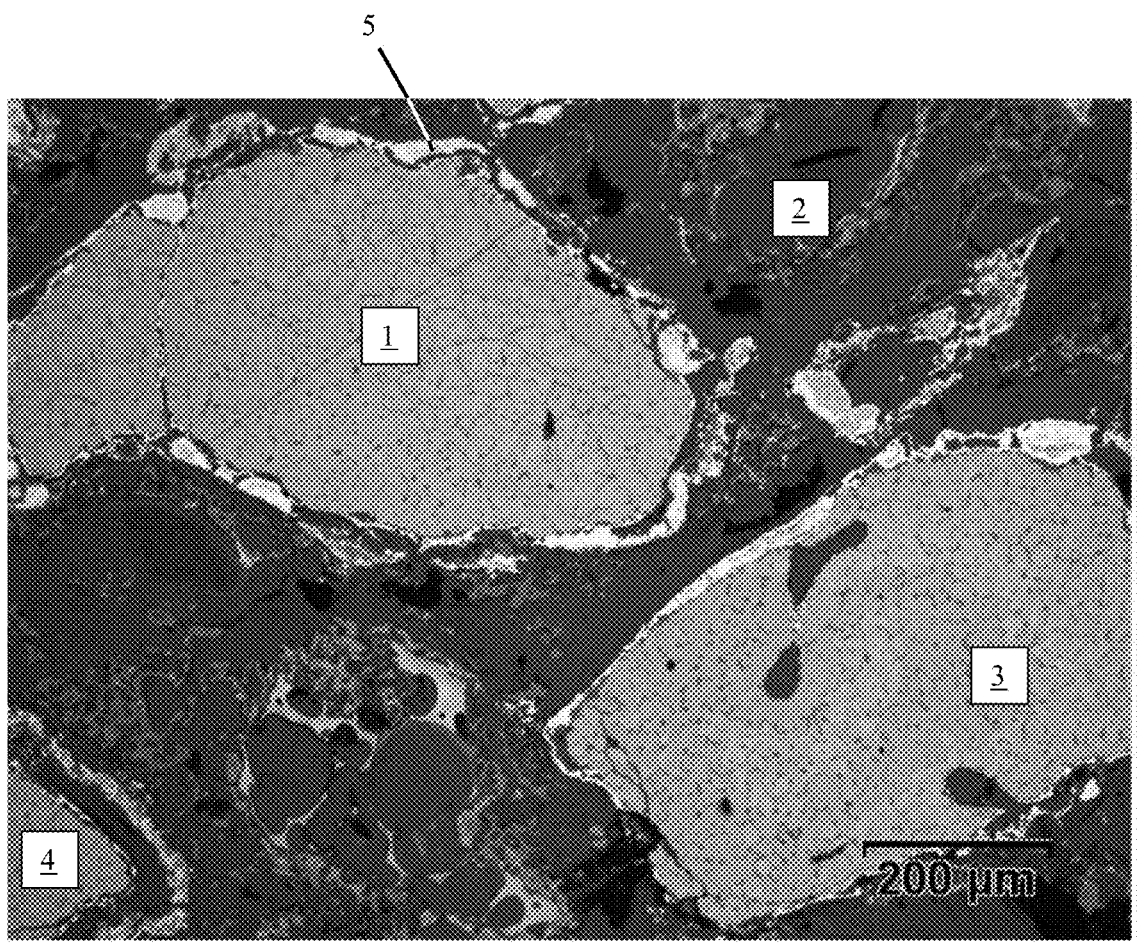

(52) U.S. Cl.
CPC .. *C04B 2235/422* (2013.01); *C04B 2235/428* (2013.01); *C04B 2235/762* (2013.01)

(56) References Cited

U.S. PATENT DOCUMENTS

| | | | |
|---|---|---|---|
| 8,790,789 B2* | 7/2014 | Ramgopal | C23C 30/00 428/546 |
| 2010/0279202 A1* | 11/2010 | Ota | H01M 4/9016 429/496 |
| 2015/0259823 A1* | 9/2015 | Kwon | C30B 29/06 117/213 |

* cited by examiner

GRANULE FOR PRODUCING A FIRE-PROOF PRODUCT, USE OF SUCH GRANULES, FIRE-PROOF PRODUCT, METHOD FOR PRODUCING A FIRE-RESISTANT PRODUCT, AND PRODUCT PRODUCED BY SAID METHOD

The invention relates to a grain for production of a refractory product, to the use of such grains, to a refractory product, to a process for producing a refractory product and to a refractory product produced thereby.

The term "refractory product" in the context of the invention refers especially to refractory ceramic products, especially having a use temperature exceeding 600° C., and preferably refractory materials according to DIN 51060: 2000-6, i.e. materials having a cone drop point >SK 17. The cone drop point can be determined especially according to DIN EN 993-12:1997-06.

Refractory products are regularly based on at least one of the oxides $Al_2O_3$, MgO, $Cr_2O_3$, $SiO_2$, CaO and $ZrO_2$.

If refractory products having high corrosion resistance or wear resistance are to be provided, these products regularly include a proportion of $ZrO_2$ (zirconium dioxide). In this respect, an example of a preferred field of use of $ZrO_2$-comprising refractory products is continuous steel casting, in which $ZrO_2$-comprising refractory products are used, for example, in the form of slide plates, monoblock stoppers, immersed tubes or submerged entry nozzles. In general, not the entire refractory product is based on $ZrO_2$, but solely the regions that have to be made particularly corrosion- or wear-resistant. More particularly, these regions may be those regions of the refractory products that, in use, are disposed in the region of the slag or at which the steel melt has a comparatively high flow rate.

In principle, $ZrO_2$ has been found to be useful as a corrosion-resistant material in such refractory products. However, when $ZrO_2$ is used in a refractory product, it is always necessary to take account of the known fact that $ZrO_2$ occurs in three modifications. For instance, pure $ZrO_2$ at room temperature and up to a temperature of about 1173° C. is in a monoclinic low-temperature phase which, above this temperature, is transformed to the tetragonal or cubic high-temperature phase. Above a temperature of about 2370° C., $ZrO_2$ is solely in cubic modification. These phase transformations are reversible, with the conversion back to the monoclinic low-temperature modification being shifted toward lower temperatures and only occurring from about 920° C.

Since the monoclinic low-temperature phase of $ZrO_2$ has a volume about 5% by volume greater than the tetragonal and cubic high-temperature phase, when the transformation temperature from the monoclinic low-temperature phase to the tetragonal or cubic high-temperature phase is crossed in the upward or downward direction, there is respectively a corresponding contraction or expansion of the $ZrO_2$. In a refractory product comprising pure $ZrO_2$, this change in volume would result in cracking in the product.

In order to avoid this jump in volume of the $ZrO_2$ when the temperature goes below the transformation temperature, it is known that the high-temperature modification can be stabilized by additions of particular oxides, such that the high-temperature modification is conserved in metastable form even at room temperature. Examples of known correspondingly stabilized oxides include MgO, CaO, $Y_2O_3$ or oxides of rare earths. For example, by an addition to $ZrO_2$ of at least 16 mol % of CaO, at least 16 mol % of MgO or at least 8 mol % of $Y_2O_3$, the cubic modification can be conserved in metastable form up to room temperature. Such completely stabilized $ZrO_2$ is also referred to as fully stabilized $ZrO_2$ (FSZ, "Fully Stabilized Zirconia"). If $ZrO_2$ has been stabilized by additions of stabilizing oxides only in such proportions that the cubic modification is only partly conserved in metastable form up to room temperature, reference is also made to partly stabilized $ZrO_2$ (PSZ, "Partly Stabilized Zirconia").

Fully stabilized $ZrO_2$ has linear thermal expansion, while partly stabilized $ZrO_2$, depending on fractions of the $ZrO_2$ that are still monoclinic, has only a more or less marked jump in volume when the transition temperature is crossed in the upward or downward direction. Correspondingly fully or partly stabilized $ZrO_2$ is therefore suitable as material for refractory products.

However, a disadvantage of fully or partly stabilized $ZrO_2$ compared to pure $ZrO_2$ is that the corrosion resistance and chemical stability of fully or partly stabilized $ZrO_2$ is reduced compared to pure $ZrO_2$. This is particularly because the stabilizing additions of substances with which the refractory product comes into contact on use form low-melting phases that are leached out of the product. Such substances may especially be constituents of the steel melt or of the slag which form low-melting phases with stabilizing additions in the form of CaO, MgO or $Y_2O_3$.

The excellent corrosion resistance of $ZrO_2$ is reduced in this respect by stabilizing additives.

If refractory products having a high corrosion resistance or wear resistance are to be provided, these products regularly include a proportion of $ZrO_2$ (zirconium dioxide).

It is an object of the invention to provide an alternative substance or raw material to $ZrO_2$ for the production of refractory products having a high corrosion resistance or wear resistance. More particularly, this substance should have only a slight degree of abnormal thermal expansion, if any, when crossing from a low-temperature phase to a high-temperature phase in the upward or downward direction.

It is a further object of the invention to provide a substance or raw material for the production of refractory products having high corrosion resistance or wear resistance, and having improved corrosion resistance compared to the fully or partly stabilized $ZrO_2$ known from the prior art.

It is a further object of the invention to provide a process for producing such a substance.

It is a further object of the invention to provide a refractory product including such a substance.

It is a further object of the invention to provide a process for producing such a refractory product and a refractory product produced thereby.

The first object is achieved in accordance with the invention by providing a grain for production of a refractory product, especially a refractory ceramic product, comprising zirconium carbonitride.

The invention is based on the surprising finding that zirconium carbonitride is an excellent substance or raw material for the production of refractory products that are to have a high corrosion resistance or wear resistance.

This finding is all the more surprising against the background of the fact that zirconium carbonitride has to date been used for quite different purposes than for the production of refractory products. Instead, zirconium carbonitride has to date been used for coating of tools for working of materials or for obtaining zirconium(IV) chloride.

According to the invention, zirconium carbonitride for production of a refractory ceramic product is now provided in the form of a zirconium carbonitride-comprising grain.

"Grain" refers in accordance with the invention to a single or individualizable particle, i.e. a body that differs from the surrounding, especially continuous medium by a phase interface. This particle may be in loose form, for example individually or in a blend of multiple grains or particles. The particle may also be incorporated into a solid medium, for example into a solid body, especially, for example, into a ceramic body. Moreover, the particle may, for example, be in the form of a crystallite which may especially be present in a microstructure, especially, for example, including a crystalline microstructure.

The invention further provides for the use of grains of the invention as raw material for the production of refractory products, especially for the production of refractory ceramic products. The use can be effected as described herein.

The invention further provides for the use of zirconium carbonitride for the production of refractory products, especially for the production of refractory ceramic products.

The invention further provides a raw material for the production of refractory products, especially for the production of refractory ceramic products, comprising grains of the invention or consisting of grains of the invention.

The invention further provides a mix for the production of refractory products, especially for the production of refractory ceramic products, comprising grains of the invention.

It has been found in accordance with the invention that the grains of the invention can already display their effect, namely, in particular, that of improving the corrosion resistance or wear resistance of a refractory product, when zirconium carbonitride is present in small proportions in the grains. In this respect, it may be the case that zirconium carbonitride is present in the grain of the invention only in a proportion of at least 1% by mass, based on the total mass of the grain, i.e., for example, also in a proportion of at least 2%, 3%, 4%, 5%, 6%, 8%, 10%, 12%, 14%, 16%, 18%, 20%, 21%, 22%, 23%, 24%, 25%, 26%, 27%, 28%, 29%, 30%, 35%, 40%, 45%, 50%, 55%, 60%, 65%, 70%, 75%, 80%, 85%, 90%, 95% to 98% by mass. However, it may also be the case that the grains of the invention consist entirely of zirconium carbonitride, i.e. that the grains of the invention comprise zirconium carbonitride in a proportion of 100% by mass, based on the total mass of the grain. It may also be the case that the grain of the invention, based in each case on the total mass of the grain, includes zirconium carbonitride in a proportion of not more than 99% by mass, i.e., for example, also in a proportion of not more than 98%, 97%, 96%, 95%, 90%, 85%, 80%, 75%, 70%, 65%, 60%, 55% or 50% by mass. In a preferred embodiment, the grain of the invention, based in each case on the total mass of the grain, includes zirconium carbonitride in a proportion of not more than 50% by mass, i.e., for example, also of not more than 48%, 45%, 40%, 35%, 30%, 25%, 20%, 15%, 10% or 5% by mass. In this respect, the proportion of zirconium carbonitride in the grain of the invention may, for example, be in the range from 1% to 100% by mass. In a preferred embodiment, the proportion of zirconium carbonitride in the grain of the invention is in the range from 1% to 50% by mass.

A grain of the invention may have, for example, an average grain size in the range from 1 to 1000 μm, i.e., for example, also an average grain size of at least 1, 5, 10, 20, 50 or 100 μm and, for example, also an average grain size of at most 1000, 500 or 200 μm. If a grain of the invention is in the form of loose particles, the size of the grain can be determined according to DIN 66165-1:2015-10. If a grain of the invention is in the form of a particle incorporated in solid form into a body, especially also in the form of a crystallite, the average grain size of the grain can be determined by the intercept method according to ASTM E 112:2013.

It has been found in accordance with the invention that grains of the invention, if they are in a refractory ceramic product, can not only improve the corrosion resistance and wear resistance of the product, but also the microstructure elasticity thereof. The inventors suspect that the basis of this effect is zirconium carbonitride acting as an elasticizer in the product when zirconium carbonitride is present in accordance with the invention as grain in the product. "Elasticizers" refer in refractory technology to substances having a different coefficient of thermal expansion than the refractory main component, such that there are mechanical stresses between the elasticizer and the main component that lead to microcracks in the microstructures in the ceramic firing and subsequent cooling. In the case of mechanical attack on the product, these microcracks can compensate for some of the fracture energy, which reduces the risk of brittle fracture of the product. According to the invention, it has now been found that the grains of the invention act as such elasticizers. The effect of the grain of the invention for improvement of the microstructure elasticity or for improvement of the fracture toughness of the refractory product is particularly effective if the grain is in the above-identified average grain size.

It has also been found in accordance with the invention that the corrosion resistance of a refractory product comprising grains of the invention can be improved in a very sustainable manner since the grains of the invention are found to be very stable in the microstructure of a refractory product. In all probability, this is because of the inertness of the grains of the invention, especially the greater inertness compared to zirconium carbonitride in amorphous form.

As well as zirconium carbonitride (Zr(C,N)), at least one of the substances zirconium carbide (ZrC) or zirconium nitride (ZrN) may be present in the grain of the invention.

The grain of the invention may, as well as zirconium carbonitride, especially also include fractions of zirconium dioxide. It has been found that, surprisingly, in the context of the invention, the advantageous effects of zirconium carbonitride and zirconium dioxide that these exert on refractory products with regard to improving corrosion and wear properties are synergistic in an exceptional manner if zirconium carbonitride and zirconium dioxide are present alongside one another in a grain. Thus, it has been found that, surprisingly, zirconium dioxide has only a slight abnormal thermal expansion or contraction, if any, when crossing the transformation temperature from the low-temperature phase to the high-temperature phases in the upward or downward direction when it is present alongside zirconium carbonitride in a grain. The inventors suspect that the expansion characteristics of zirconium dioxide on the one hand and zirconium carbonitride on the other hand counteract one another in the event of temperature changes and therefore at least partly compensate for one another in a grain comprising zirconium dioxide and zirconium carbonitride.

According to the invention, "zirconium dioxide" refers to the oxide zirconium(IV) oxide, i.e. $ZrO_2$.

In one embodiment, the grain of the invention has a proportion of zirconium dioxide of at least 1% by mass, based on the total mass of the grain, i.e., for example, also a proportion of at least 2%, 3%, 4%, 5%, 6%, 8%, 10%, 12%, 14%, 16%, 18%, 20%, 25%, 30%, 35%, 40%, 45% by mass. In a preferred embodiment, the grain of the invention has a proportion of zirconium dioxide of at least 50% by mass, based on the total mass of the grain, i.e., for example, also a proportion of at least 55%, 60%, 65%, 70%, 75%, 80%, 85%, 90% or 95% by mass. It has been found in accordance with the invention that the above-described advantageous effect that zirconium carbonitride exerts on the expansion characteristics of zirconium dioxide is already established when zirconium carbonitride is present in only very small proportions alongside zirconium dioxide in the grain of the invention; more particularly, this effect can already be established if zirconium carbonitride is present only in proportions of at least 1% by mass alongside zirconium dioxide in the grain of the invention. In this respect, it may be the case that the grain of the invention includes zirconium dioxide in a proportion of up to 99% by mass, i.e., for example, also in a proportion of not more than 98%, 97%, 96%, 95%, 90%, 85%, 80%, 75%, 70%, 65%, 60%, 55%, 45%, 40%, 35%, 30%, 25%, 20%, 15%, 10% or 5% by mass. In this respect, the proportion of zirconium dioxide in the grain of the invention may, for example, be in the range from 1% to 99% by mass. In a preferred embodiment, the proportion of zirconium dioxide in the grain of the invention may, for example, be in the range from 1% to 50% by mass.

Preferably, the zirconium dioxide in the grain of the invention is in cubic modification.

According to the invention, it has been found that the thermal expansion or contraction of the grain of the invention when crossing the transformation temperature of zirconium dioxide in the upward or downward direction is particularly small when the mass ratio of the mass of zirconium dioxide to the mass of zirconium carbonitride in the grain of the invention is within a particular range, namely at least 0.02 and at most 49, and is especially at least 0.1 or 0.5 or 1.0 or 1.2 or 1.4 or 1.6 or 1.8 or 2.0 or 2.1 or 2.2 or 2.3 or 2.4 and at most 45 or 40 or 35 or 30 or 25 or 20 or 15 or 12 or 10 or 9 or 8 or 7 or 6 or 5.5 or 5 or 4.5 or 4 or 3.5 or 3.2 or 3.1 or 3.0 or 2.9 or 2.8 or 2.7 or 2.6 or 2.5.

The distribution of zirconium dioxide and zirconium carbonitride may be inhomogeneous over the volume of the grain of the invention. In a particularly preferred embodiment, zirconium carbonitride is concentrated in the edge region of the grain. In this embodiment, accordingly, proportion by mass of zirconium carbonitride in regions of the grain further to the outside, especially in the edge region of the grain, are higher than in regions of the grain further to the inside. The proportion by mass here is based on the respective region of the grain.

It has been found in accordance with the invention that zirconium carbonitride, if it is concentrated in the edge region of the grain, can particularly effectively compensate for or suppress the thermal expansion or contraction of zirconium dioxide if it is present alongside zirconium carbonitride in the grain. The inventors suspect that the thermal expansion of the zirconium dioxide is suppressed particularly effectively in this embodiment of the invention since the zirconium carbonitride concentrated in the edge region of the grain surrounds the zirconium dioxide concentrated in the interior of the grain like a shell and can therefore effectively counteract contraction of zirconium dioxide that acts in the outward direction beyond the grain boundary.

It has also been found in accordance with the invention that zirconium dioxide, if it is present alongside zirconium carbonitride in the grain, has improved corrosion resistance in the grain of the invention compared to the fully or partly stabilized $ZrO_2$ known from the prior art with equal proportions of stabilizing oxides. More particularly, it has been found that zirconium dioxide in this respect has improved corrosion resistance compared to the fully or partly stabilized $ZrO_2$ known from the prior art with equal proportions of stabilizing oxides in the form of MgO, CaO, $Y_2O_3$ or oxides of rare earths.

This is because it has been found in accordance with the invention that zirconium carbonitride counteracts corrosion of zirconium dioxide. The protection of the zirconium dioxide from corrosion is particularly effective if zirconium carbonitride, as set out above, is concentrated in the edge region of the grain and surrounds the zirconium dioxide more highly concentrated in the interior of the grain in a protective manner like a shell.

It may be the case that the grain of the invention comprises the following elements in the following proportions by mass, based in each case on the total mass of the grain, where the elements may each be present individually or in combination in these proportions by mass:

zirconium: 5% to 97% by mass, i.e., for example, also at least 5%, 10%, 20%, 30%, 40%, 50%, 52%, 54%, 56%, 58%, 60%, 62%, 64%, 65%, 66%, 67%, 68% or 69% by mass and, for example, also at most 97%, 96%, 94%, 92%, 90%, 88%, 86%, 84%, 82%, 80%, 79%, 78%, 77%, 76%, 75%, 74%, 73%, 72% or 71% by mass;

oxygen: 1% to 50% by mass, i.e., for example, also at least 1%, 2%, 4%, 6%, 8%, 10%, 11%, 12%, 13%, 14%, 15%, 16%, 17%, 18 or 19% by mass and, for example, also at most 50%, 40%, 30%, 29%, 28%, 27%, 26%, 25%, 24%, 23%, 22% or 21% by mass;

nitrogen: 1% to 30% by mass, i.e., for example, also at least 1%, 2%, 3%, 4%, 5%, 6% or 7% by mass and, for example, also at most 30%, 20%, 15%, 14%, 13%, 12%, 11% or 10% by mass;

carbon: 1% to 30% by mass, i.e., for example, also at least 1%, 2%, 3%, 4%, 5%, 6% or 7% by mass and, for example, also at most 30%, 20%, 15%, 14%, 13%, 12%, 11% or 10% by mass;

hafnium: 0% to 4% by mass, i.e., for example, also at least 0.5% or 1.0% or 1.5% by mass and, for example, also at most 4.0% or 3.5% or 3.0% or 2.5% or 2.0% by mass;

calcium: 0% to 8% by mass, i.e., for example, also at least 0.5% or 1.0% by mass and, for example, also at most 8%, 7%, 6%, 5%, 4%, 3%, 2%, 1% or 0.5% by mass;

magnesium: 0% to 8% by mass, i.e., for example, also at least 0.5% or 1.0% by mass and, for example, also at most 8%, 7%, 6%, 5%, 4%, 3%, 2%, 1% or 0.5% by mass;

yttrium: 0% to 8% by mass, i.e., for example, also at least 0.5% or 1.0% by mass and, for example, also at most 8%, 7%, 6%, 5%, 4%, 3%, 2%, 1% or 0.5% by mass;

iron: 0% to 2% by mass, i.e., for example, also at least 0.1% by mass and, for example, also at most 1.5% or 0.8% or 0.5% by mass;

aluminum: 0% to 2% by mass, i.e., for example, also at least 0.1% by mass and, for example, also at most 1.5% or 0.8% or 0.5% by mass;

silicon: 0% to 2% by mass, i.e., for example, also at least 0.1% by mass and, for example, also at most 1.5% or 0.8% or 0.5% by mass.

It has been found in accordance with the invention that the grain of the invention can be very sensitive to further elements present in the grain alongside the above-identified elements, especially in the above-identified proportions. More particularly, the thermal expansion of the grain can increase again when further elements are present in the grain alongside the above-identified elements. In one embodiment of the invention, the grain of the invention therefore includes, as well as the above-identified elements zirconium, oxygen, nitrogen, carbon, hafnium, calcium, magnesium, yttrium, iron and aluminum, further elements only in a total mass of below 10% by mass, based on the total mass of the grain, especially in a total mass below 9%, 8%, 7%, 6%, 5%, 4%, 3%, 2% or even below 1% by mass.

The production of the grain of the invention can at first proceed from a zirconium dioxide known from the prior art, which may especially be in grain form, for example in the form of a collection of loose grains. Alternatively, the zirconium dioxide may also be present, for example, as a constituent of a solid body, for example in the form of grains or crystallites of zirconium dioxide in a ceramic body. The zirconium dioxide according to the prior art that has been provided as starting material may especially also be provided in the form of partly or fully stabilized zirconium dioxide. The grain of the invention can now be obtained by firing of such zirconium dioxide in reducing atmosphere in the presence of carbon and nitrogen.

After the firing, the zirconium dioxide is cooled down, especially to room temperature, which affords a grain of the invention.

The reducing atmosphere during the firing may preferably have a partial oxygen pressure below $10^{-6}$ Pa, i.e., for example, also a partial oxygen pressure below $10^{-7}$ or $10^{-8}$ Pa. The reducing atmosphere may, as known from the prior art, be generated, for example, by firing the zirconium dioxide provided as starting material in the presence of a carbon carrier, for example in the form of graphite, carbon black, coke, pitch or charcoal, preferably in a closed furnace space. For this purpose, the partly or fully stabilized zirconium dioxide can be placed, for example, on a bed of such a carbon carrier or be mixed with such a carbon carrier.

If a carbon carrier is provided for generation of the reducing atmosphere in the firing, as above, the carbon in the carbon carrier, as well as its function of establishing a reducing atmosphere in the firing, simultaneously also fulfills the further function of being available as reactant for the zirconium dioxide during the firing in order to form zirconium carbonitride together with the zirconium in the zirconium dioxide and with nitrogen.

In order to provide the nitrogen required for the formation of zirconium carbonitride, a nitrogen carrier should also be provided. In this respect, in accordance with the invention, a nitrogen carrier may be provided during the firing, especially a solid nitrogen carrier, especially in granular form, for example at least one nitride, especially, for example, in the form of at least one of the nitrides aluminum nitride (AlN) or silicon nitride ($Si_3N_4$).

The reducing firing is preferably executed at temperatures within a temperature range in which the zirconium dioxide is at least partly converted to its cubic modification, i.e. preferably at temperatures above 1173° C. More particularly, the firing is conducted at temperatures of at least 1250° C., i.e., for example, at at least 1280° C., 1300° C., 1350° C., 1400° C., 1450° C. or 1500° C. In addition, the firing is preferably conducted at temperatures of at most 1800° C., i.e., for example, also at temperatures of at most 1750° C., 1700° C., 1650° C., 1600° C. or 1580° C. More preferably, the firing is conducted at a temperature in the range from 1280° C. to 1580° C. Over and above a firing time of about 12 hours, the zirconium dioxide increasingly reacts with carbon and nitrogen to give zirconium carbonitride. In this respect, the firing should preferably be conducted for a duration exceeding 12 hours. Since the proportion of zirconium carbonitride increases with increasing firing time, the firing can also be conducted for a period of at least 16, 20, 24 or 48 hours. Since the formation of zirconium carbonitride can decrease again over and above a firing time of more than 24 hours since the zirconium dioxide has already reacted completely or substantially to give zirconium carbonitride, the firing time may be at most 48, 36 or 24 hours.

If the starting material provided for production of the grains of the invention is a fully or partly stabilized zirconium dioxide according to the prior art, and the grain of the invention simultaneously also includes proportions of zirconium dioxide as well as zirconium carbonitride, one or more reactants for the stabilizing additions may be provided during the firing. These reactants may especially be provided such that they are in gaseous form during the firing. Corresponding reactants, especially in gaseous form, form compounds with the stabilizing additions of the zirconium dioxide during the reducing firing of the zirconium dioxide, which results in at least partial and preferably predominant removal of the stabilizing additions from the zirconium dioxide. After the zirconium dioxide has been cooled down, the proportion of the stabilizing additions in the zirconium dioxide has been reduced as a result compared to the proportion of stabilizing additions before the firing, and so these removed stabilizing additions do not have any further adverse effect on the corrosion resistance of the zirconium dioxide. At the same time, the cubic high-temperature modification of the zirconium dioxide, in spite of the at least partial removal of the stabilizing additions, is conserved in metastable form even at room temperature. Overall, what is obtained by virtue of this process feature is accordingly a grain of the invention having proportions of zirconium carbonitride and zirconium dioxide, where the zirconium dioxide, in spite of the small proportion of stabilizing additions, forms a metastable mineral phase in cubic modification at room temperature.

The gaseous reactant that reacts with the stabilizing additions during the reducing firing of the zirconium dioxide may in principle be any substance or mixture of substances which is/are present in gaseous form in the furnace atmosphere during the firing and enter(s) into a reaction with at least one stabilizing addition, but preferably all stabilizing additions, i.e. especially with stabilizing additions in the form of at least one of the following substances: CaO, MgO, $Y_2O_3$ or oxides of rare earths.

In a particularly preferred embodiment, a gaseous reactant is present in the form of silicon- and/or aluminum-comprising gas. In order to provide such a silicon- and/or aluminum-containing gas during the reducing firing of the zirconium dioxide, metallic silicon and/or aluminum may be provided, which forms silicon- and/or aluminum-containing gas during the reducing firing. The silicon in the silicon-containing gas or the aluminum in the aluminum-containing gas reacts during the firing especially with stabilizing additions in the form of calcium oxide, magnesium oxide or yttrium oxide, such that these stabilizing additions are at least partly removed from the zirconium dioxide.

Alternatively or cumulatively, a gaseous reactant may be in the form, for example, of carbon monoxide, which can form from the carbon carrier during the firing. In this respect, a gaseous reactant may, for example, be in the form of at least one of the gaseous substances silicon, aluminum or carbon monoxide.

If correspondingly gaseous reactants are present during the firing, it may also be the case that the reducing firing is conducted at temperatures above 2370° C., such that the zirconium dioxide has been fully converted to its cubic modification. In the latter case, the zirconium dioxide, after the cooling, may be largely or completely in a cubic modification which is (meta)stable at room temperature. However, the firing is conducted in each case at temperatures below the melting temperature of zirconium dioxide, i.e. below 2690° C.

The zirconium dioxide provided as starting material may, for the firing for production of the grain of the invention, be subjected to the reducing firing together with the further components as detailed above. Preferably, the zirconium dioxide provided as starting material, before the firing, is mixed with the further components and subjected to the firing as a corresponding mixture. In such a mixture, the zirconium dioxide provided as starting material may be present, for example, in a proportion by mass, based on the total mass of the mixture, in the range from 20% to 99% by mass, i.e., for example, in a proportion by mass of at least 20%, 25%, 30%, 35%, 40% or 45% by mass and, for example, in a proportion by mass of at most 98%, 95%, 90%, 85%, 80%, 75%, 70%, 65%, 60% or 55% by mass. One or more carbon carriers may be present in the mixture, for example, in a total proportion by mass, based on the total mass of the mixture, in the range from 1% to 80% by mass, i.e., for example, in a proportion by mass of at least 1%, 5%, 10%, 15% or 20% by mass and, for example, in a proportion by mass of at most 80%, 70%, 60%, 50%, 45%, 40%, 35% or 30% by mass. If silicon and/or aluminum are present as reactants for stabilizing additions in the mixture, these may be present, for example, in a total proportion by mass, based on the total mass of the mixture, in the range from 1% to 40% by mass, i.e., for example, in a proportion by mass of at least 1%, 5%, 10%, 15% or 20% by mass and, for example, in a proportion by mass of at most 40%, 35% or 30% by mass. If a nitrogen carrier is provided, for example at least one nitride, especially, for example, aluminum nitride and/or silicon nitride, it may be present in the mixture, for example, in a proportion by mass, based on the total mass of the mixture, in the range from 1% to 20% by mass, i.e., for example, in a proportion by mass of at least 1%, 2%, 5% or 8% by mass and, for example, in a proportion by mass of at most 20%, 15% or 10% by mass.

The mixture may be bound by binders, especially organic green binders, which are volatilized in the firing. For example, it is possible to use a green binder in the form of dextrin.

The invention also provides a process for producing a grain of the invention based on zirconium dioxide, comprising the following steps:
providing zirconium dioxide;
firing the zirconium dioxide in reducing atmosphere in the presence of at least one of the following substances: carbon and nitrogen;
cooling the zirconium dioxide.

Otherwise, the process may comprise the steps described herein.

The invention further provides a refractory product comprising at least one grain of the invention. The invention further provides a refractory product comprising grains of the invention.

The refractory product of the invention may especially be a formed product, especially a wearing part, more preferably a wearing part in continuous steel casting, for example a monoblock stopper, a nozzle, an immersed tube or a submerged entry nozzle.

In a product or wearing part of this kind, the grain of the invention may especially be present in the regions in which the product comes into contact with the slag, for example in the slag region of a monoblock stopper, or where the product comes into contact with the steel melt at a high flow rate, for example in the immersion region of the ladle distributor tube, at the passage of a slide plate, at the stopper nose, and in the intake and immersion region of the submerged entry nozzle. In this respect, the product of the invention may for example be a ladle distributor tube, a slide plate, a monoblock stopper, a nozzle or a submerged entry nozzle. For example, the grain of the invention may be used in the region of the slag band of a stopper.

The product of the invention may especially be a product that has been formed by isostatic pressing.

In the product of the invention, the grain of the invention may be present, for example, in a carbon matrix. The carbon matrix may especially be in the form of graphite.

In principle, however, the product of the invention may be any refractory product, i.e., for example, including a refractory ceramic product, i.e. a sintered refractory product in the form of grains that have been sintered together. In this respect, grains of the invention may be present in the product of the invention, for example, in the form of sintered grains.

The invention further provides a process for producing a refractory product, comprising the following steps:
providing grains of the invention;
combining the grains with further refractory raw materials;
pressing a shaped body from the grains and the further refractory raw materials;
firing the shaped body to give a refractory product.

In the process of the invention, what is provided at first is thus a refractory raw material consisting of or at least comprising grains of the invention. This raw material may be combined exclusively with one or more further refractory raw materials, for example with refractory raw materials based on at least one of the following substances: $Al_2O_3$, $MgO$, $SiO_2$, $Cr_2O_3$ or carbon.

The raw materials are subsequently pressed to give a shaped body, i.e. what is called a green body, especially, for example, by isostatic pressing.

The green body can subsequently be subjected to firing, whereupon a refractory product is obtained after cooling.

Otherwise, a refractory product of the invention can be produced by the process steps known from the prior art.

The invention further provides a refractory product that has been produced by a process of the invention.

Further features of the invention are apparent from the claims, the appended figures and accompanying elucidations, and the working example.

All the features of the invention disclosed herein, individually or in combination, can be combined with one another as required.

A working example of the process of the invention for production of the grain of the invention and of a grain produced thereby are elucidated in detail hereinafter.

The starting material provided for the performance of the process of the invention was firstly cubic zirconium dioxide which had been partly stabilized by a proportion of calcium oxide about 4-5% by mass (corresponding to a proportion of calcium of about 2.8-3.6% by mass), in the form of grain material having an average grain size in the range from >0 mm to <0.7 mm.

A further starting material provided was a carbon carrier in the form of carbon black having a carbon content of about 96% by mass, based on the total mass of the carbon carrier, which was in powder form.

Another starting material provided was a nitrogen carrier in the form of aluminum nitride in grain form.

A further starting material was formed by metallic silicon and aluminum powder.

These starting materials were mixed together with a green binder in the form of dextrin to give a mixture. The proportions by mass of the starting materials in the mixture, based in each case on the total mass of the mixture, were as follows: zirconium dioxide: 48% by mass; carbon black: 24% by mass; aluminum nitride: 6% by mass; silicon powder: 11% by mass; aluminum powder: 11% by mass. The proportion by mass of dextrin, based on the mixture without the dextrin, was 2.5% by mass.

The correspondingly provided mixture was subsequently subjected to further treatment in two different ways.

Firstly, the mixture was fired in a closed furnace space at a temperature of about 1550° C. for about 12 hours. The correspondingly fired mixture is referred to hereinafter as "Sample 1".

Secondly, the mixture was fired in a closed furnace space at a temperature of about 1300° C. for about 24 hours. The correspondingly fired mixture is referred to hereinafter as "Sample 2".

During the firing of samples 1 and 2, the carbon black generated a reducing atmosphere, such that the partial oxygen pressure in the furnace space was about $10^{-7}$ Pa. In addition, carbon components of the carbon black and nitrogen components of the aluminum nitride reacted during the firing with proportions of zirconium in the zirconium dioxide to give zirconium carbonitride. Finally, during the firing, the pulverulent metallic silicon and aluminum formed silicon- and aluminum-rich gas which reacted with proportions of the calcium oxide in the partly stabilized zirconium dioxide. As a result, the proportion of calcium in the stabilized zirconium dioxide was reduced during the firing in the case of samples 1 and 2 to a proportion averaging below 0.8% by mass.

After performance of the firing of samples 1 and 2, the zirconium dioxide was cooled down to room temperature, and then grains of the invention were obtained. During the firing, the calcium oxide present in the cubic zirconium dioxide was removed; nevertheless, the cubic zirconium dioxide was conserved in metastable form at room temperature even after substantial removal of the calcium oxide. The zirconium carbonitride formed during the firing was concentrated predominantly in the edge region of the grains.

Figure 2:
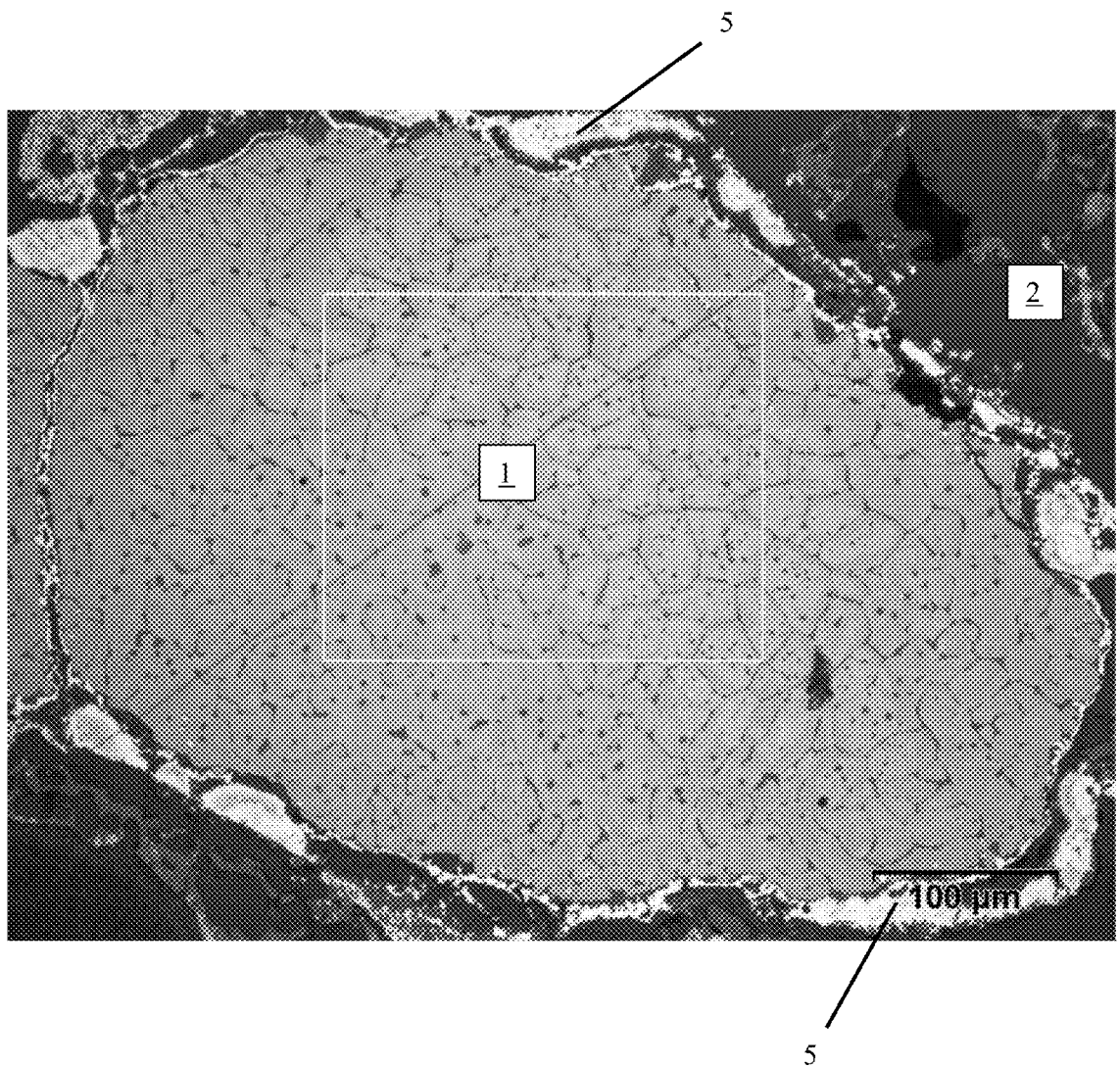
Figure 3:
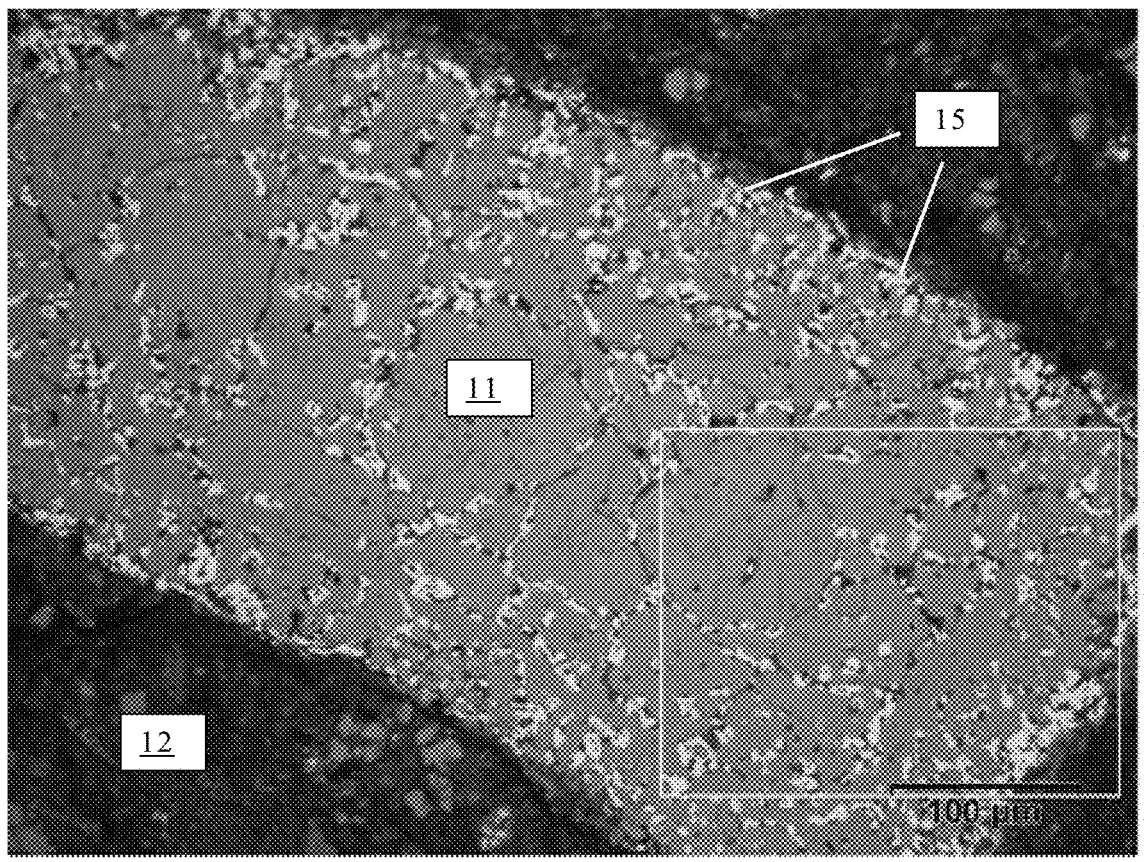
Figure 4:
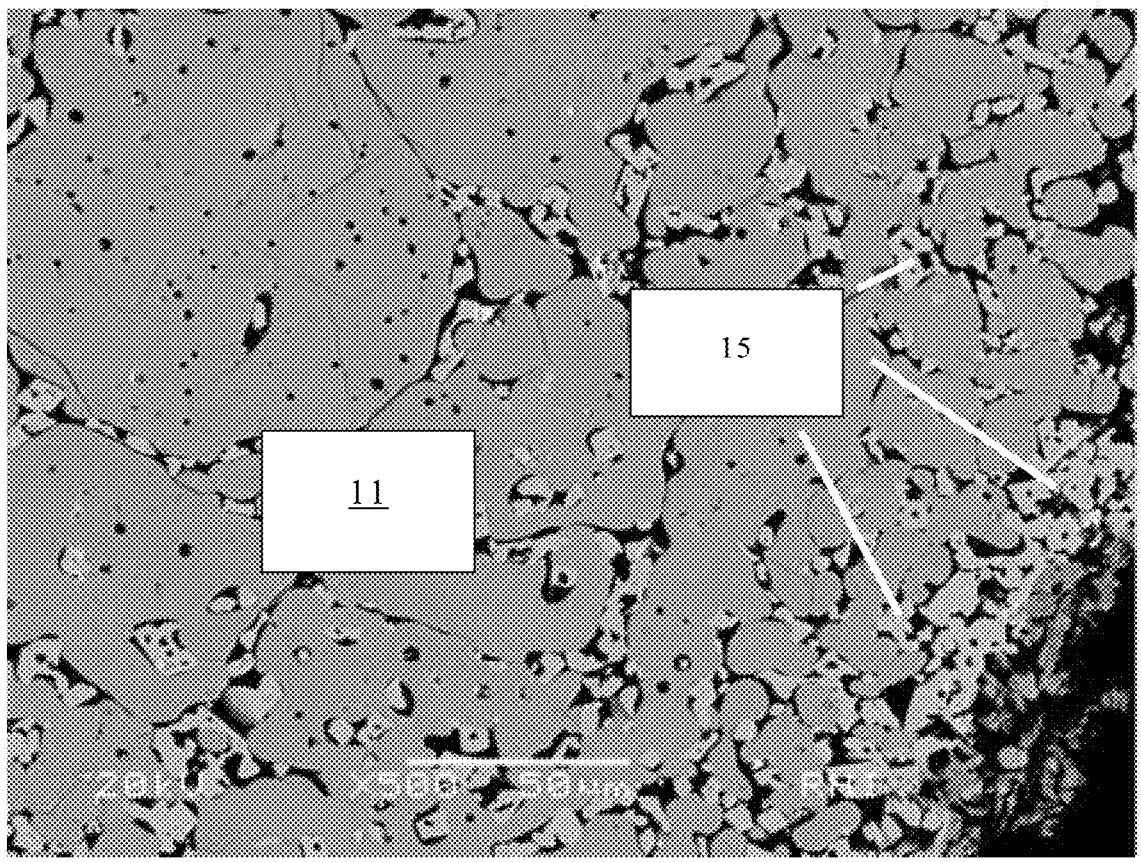

Two images of polished sections of the grains produced as above according to samples 1 and 2 are appended as figures. The figures show:

FIG. 1 a reflected light microscopy image of a polished section of sample 1, FIG. 2 a detail of the polished section of FIG. 1 in a scanning electron micrograph, FIG. 3 a reflected light microscopy image of a polished section of sample 2 and FIG. 4 a detail of the polished section of FIG. 3 in a scanning electron micrograph.

The black bar bottom right in FIG. 1 corresponds to a length of 200 μm. In FIG. 1, it is possible to see a grain of the invention identified by reference numeral 1, having a size of about 520×380 μm. The grain 1 is embedded into a carbon matrix 2 that has formed from the carbon black during the firing.

Further grains of the invention that have formed during the firing are identified by reference numerals 3 and 4.

The average elemental composition of the grain 1 is, for instance, as follows, where the proportion by mass of the respective element is reported in relation to the total mass of the grain 1:

zirconium: about 65.0%
oxygen: about 18.0%;
nitrogen: about 6.0%
carbon: about 7.0%;
calcium: about 2.5%
magnesium: 0%;
yttrium: 0%;
iron: <0.5%;
aluminum: <0.5%.

However, the proportions by mass of the respective elements are not distributed homogeneously over the volume of the grain 1. Instead, zirconium carbonitride is concentrated in the edge region of the grain 1. This concentration of zirconium carbonitride in the edge region of the grain 1 is reflected, inter alia, in the concentration of the element carbon, which is significantly higher in the edge region of the grain 1 than in the interior of the grain 1.

This concentration of zirconium carbonitride is reflected visually in the edge region of the grain 1 in FIGS. 1 and 2 in a thin seam 5 that completely surrounds the grain 1 at the edge.

The proportion of zirconium carbonitride in the grain 1 is about 5% by mass and the proportion of cubic zirconium dioxide is about 90% by mass, based in each case on the total mass of the grain 1. The residual phase component of the grain 1 is formed essentially from melt phases based on the oxides CaO, $SiO_2$ and $ZrO_2$.

The black bar bottom right in FIG. 3 corresponds to a length of 100 μm. In FIG. 3, it is possible to see a grain of the invention identified by reference numeral 11, having a size of about 700×325 μm. The grain 11 is embedded into a carbon matrix 12 that has formed from the carbon black during the firing.

The average elemental composition of the grain 11 is as follows, where the proportion by mass of the respective element is reported in relation to the total mass of the grain 11:

zirconium: about 64.0%
oxygen: about 17.0%;
nitrogen: about 8.0%
carbon: about 9.0%;
calcium: about 1.0%
magnesium: 0%;
yttrium: 0%;
iron: <0.5%;
aluminum: <0.5%.

However, the proportions by mass of the respective elements are not distributed homogeneously over the volume of the grain 11. Instead, zirconium carbonitride is concentrated in the edge region of the grain 11. This concentration of zirconium carbonitride in the edge region of the grain 11 is reflected, inter alia, in the concentration of the element carbon, which is significantly higher in the edge region of the grain 11 than in the interior of the grain 11.

This concentration of zirconium carbonitride is reflected visually in the edge region of the grain 11 in FIGS. 3 and 4 in a thin seam 15 that completely surrounds the grain 11 at the edge.

The proportion of zirconium carbonitride in the grain 11 is about 23% by mass and the proportion of cubic zirconium dioxide is about 72% by mass, based in each case on the total mass of the grain 11. The residual phase component of the grain 11 is formed essentially from melt phases based on the oxides CaO, $SiO_2$ and $ZrO_2$.

The invention claimed is:

1. A refractory product, having a use temperature exceeding 600° C., comprising a grain, said grain comprising zirconium carbonitride and zirconium dioxide, wherein said zirconium dioxide is in the form of a room temperature metastable mineral phase in cubic modification.

2. The product as claimed in claim 1 in the form of a wearing part in continuous steel casting.

3. The product as claimed in claim 2 in the form of a slide plate, a monoblock stopper, a nozzle, an immersed tube or a submerged entry nozzle.

4. The product as claimed in claim 1, wherein zirconium carbonitride is concentrated in the edge region of the grain.

5. The product as claimed in claim 1, wherein the grain has a proportion of zirconium carbonitride in the range from 1% to 99% by mass.

6. The product as claimed in claim 1, wherein the grain has a proportion of zirconium dioxide in the range from 1% to 99% by mass.

7. The product as claimed in claim 1, wherein the grain comprises the following elements in the following proportions by mass:
zirconium: 5-97%;
oxygen: 1-50%;
nitrogen: 1-30%;
carbon: 1-30%;
hafnium: 0-4%;
calcium: 0-8%;
yttrium: 0-8%;
iron: 0-2%;
aluminum: 0-2%; and
silicon: 0-2%.

8. A process for producing a refractory product, having a use temperature exceeding 600° C., comprising the following steps:
providing grains for production of a refractory product, wherein the grains comprise zirconium carbonitride and zirconium dioxide, wherein said zirconium dioxide is in the form of a room temperature metastable mineral phase in cubic modification;
combining the grains with further refractory raw materials;
pressing a shaped body from the grains and the further refractory raw materials; and
firing the shaped body to give a refractory product.

9. A refractory product having a use temperature exceeding 600° C., the refractory product produced by the following process:
providing grains for production of a refractory product, wherein said grains comprise zirconium carbonitride and zirconium dioxide, wherein said zirconium dioxide is in the form of a room temperature metastable mineral phase in cubic modification;
combining the grains with further refractory raw materials;
pressing a shaped body from the grains and the further refractory raw materials; and
firing the shaped body to give a refractory product.

* * * * *